US011885472B1

(12) United States Patent
Mun et al.

(10) Patent No.: US 11,885,472 B1
(45) Date of Patent: Jan. 30, 2024

(54) LAMP FOR VEHICLE

(71) Applicants: HYUNDAI MOBIS CO., LTD., Seoul (KR); ETENDUE LIGHTING CO., LTD., Bucheon-si (KR)

(72) Inventors: Sun Kwon Mun, Yongin-si (KR); Sun Gu Kang, Bucheon-si (KR); So Young Lee, Seoul (KR)

(73) Assignees: HYUNDAI MOBIS CO., LTD., Seoul (KR); ETENDUE LIGHTING CO., LTD., Bucheon-si (KR)

( * ) Notice: Subject to any disclaimer, the term of this patent is extended or adjusted under 35 U.S.C. 154(b) by 0 days.

(21) Appl. No.: 18/068,614

(22) Filed: Dec. 20, 2022

(30) Foreign Application Priority Data

Oct. 13, 2022 (KR) ........................ 10-2022-0131794

(51) Int. Cl.

| | |
|---|---|
| ***F21S 41/43*** | (2018.01) |
| ***F21S 41/32*** | (2018.01) |
| ***F21S 41/683*** | (2018.01) |
| ***F21S 41/143*** | (2018.01) |
| *F21W 102/13* | (2018.01) |

(52) U.S. Cl.

CPC ............ *F21S 41/43* (2018.01); *F21S 41/143* (2018.01); *F21S 41/32* (2018.01); *F21S 41/683* (2018.01); *F21W 2102/13* (2018.01)

(58) Field of Classification Search

CPC .... F21W 2102/13; F21S 41/32; F21S 41/683; F21S 41/43; F21S 41/143

See application file for complete search history.

(56) References Cited

U.S. PATENT DOCUMENTS 3,426,189 A * 2/1969 Deputy .................. F21S 41/13 362/279

FOREIGN PATENT DOCUMENTS

| | | | | |
|---|---|---|---|---|
| CH | 123084 | A | 10/1927 | |
| DE | 10355747 | A1 | 3/2005 | |
| DE | 102008010028 | A1 | 8/2009 | |
| DE | 102008021520 | A1 | 11/2009 | |
| DE | 102008049222 | A1 | 4/2010 | |
| DE | 202010008294 | U1 | 3/2011 | |
| DE | 102009051026 | A1 * | 5/2011 | .......... F21S 48/1768 |
| DE | 102009054249 | A1 | 5/2011 | |
| DE | 202011103438 | U1 | 10/2011 | |
| DE | 102010033902 | A1 | 1/2012 | |
| DE | 102015205510 | A1 | 9/2016 | |
| DE | 102019118981 | A1 | 1/2021 | |
| DE | 102020209798 | A1 * | 8/2021 | ............... F21K 9/65 |
| EP | 2154425 | A2 * | 2/2010 | ............... B60Q 1/12 |
| EP | 2767752 | A1 | 8/2014 | |

OTHER PUBLICATIONS

Office Action dated Jun. 7, 2023 in corresponding German patent application No. 102022133950.5.

* cited by examiner

*Primary Examiner* — Anabel Ton

(74) *Attorney, Agent, or Firm* — NovoTechIP International PLLC

(57) ABSTRACT

Disclosed is a lamp for a vehicle including a light source part that irradiates light, and a shutter unit provided on a front side of the light source part and that shuts at least a portion of the light, the shutter unit includes a plurality of shutter members that are moved in a direction that crosses a forward/rearward direction (F), and the plurality of shutter members are spaced apart from each other along the forward/rearward direction (F).

20 Claims, 9 Drawing Sheets

LAMP FOR VEHICLE

CROSS-REFERENCE TO RELATED APPLICATION

This application claims the benefit of priority to Korean Patent Application No. 10-2022-0131794, filed in the Korean Intellectual Property Office on Oct. 13, 2022, the entire contents of which are incorporated herein by reference.

TECHNICAL FIELD

The present disclosure relates to a lamp for a vehicle, and more particularly, to a lamp for a vehicle that may foam a plurality of light distribution patterns.

BACKGROUND

Lamps for forming various kinds of light distribution patterns are mounted on a vehicle. For example, it is necessary for the lamps mounted on the vehicle to form a light distribution pattern for a daytime running lamp (DRL), a light distribution pattern for a turn signal, and the like, in addition to a light distribution pattern for a low beam and a light distribution pattern for a high beam.

Meanwhile, according to a conventional technology, means for implementing a plurality of light distribution patterns in one kind of lamp is disclosed. For example, according to a conventional technology, a lamp that may form a light distribution pattern for a low beam and a light distribution pattern for a high beam by moving a shield through an actuator that drives the shield is disclosed. However, according to the lamp, a volume occupied by the actuator is large so that it is difficult to miniaturize the lamp, and there is a limit in forming light distribution patterns other than the light distribution pattern for a low beam and the light distribution pattern for a high beam.

Meanwhile, in recent years, lamps in a scheme of individually controlling turn-on and turn-off of a plurality of LEDs mounted thereon have been increasingly used, but it is difficult to implement many kinds of light distribution patterns even in this kind of lamps.

SUMMARY

The present disclosure has been made to solve the above-mentioned problems occurring in the prior art while advantages achieved by the prior art are maintained intact.

An aspect of the present disclosure provides a lamp for a vehicle of a new type that may implement various kinds of light distribution patterns.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source part that irradiates light, and a shutter unit provided on a front side of the light source part and that shuts at least a portion of the light, the shutter unit may include a plurality of shutter members that are moved in a direction that crosses a forward/rearward direction (F), and wherein the plurality of shutter members are spaced apart from each other along the forward/rearward direction (F).

The plurality of shutter members may overlap each other when the shutter unit is viewed in a state, in which the plurality of shutter members are spaced apart from the shutter unit to one side in the forward/rearward direction (F).

The plurality of shutter members may be moved in an upward/downward direction (H).

The shutter unit further may include a unit body, in which a through-hole having a shape that passes therethrough along the forward/rearward direction (F), and the plurality of shutter members may be coupled to a circumferential area of the unit body, which defines a border of the through-hole, and are provided to be moved with respect to the circumferential area.

The plurality of shutter members may be coupled to the unit body to be movable in an upward/downward direction.

The circumferential area of the unit body may include an insertion section having a shape that is recessed in a direction that becomes farther from the through-hole, and the plurality of shutter members may be inserted into the insertion section.

The shutter member may include an upper shutter member coupled to an upper circumferential area formed in an upper area of the circumferential area, and a lower shutter member coupled to a lower circumferential area formed in a lower area of the circumferential area.

The upper shutter member may be coupled to the upper circumferential area to be moved in a direction that crosses the forward/rearward direction (F), and the lower shutter member may be coupled to the lower circumferential area to be moved in a direction that crosses the forward/rearward direction (F).

The plurality of shutter members include a shutter member for a low beam, in which a cutoff area having a step shape is foiled at an upper end thereof.

The shutter member may include a lower shutter member coupled to a lower circumferential area of the circumferential area, which is formed in a lower area.

The shutter member may include a non-light transmissive material that shuts the light irradiated from the light source part.

The plurality of shutter members include a shutter member for a DRL that transmits at least a portion of the light irradiated from the light source part to form a DRL light distribution pattern, and the shutter member for the DRL may include an upper shutter member coupled to an upper circumferential area famed in an upper area of the circumferential area, and a lower shutter member coupled to a lower circumferential area of a lower area thereof.

The plurality of shutter members include a shutter member for a surface irradiation pattern that foams the surface irradiation pattern by shutting at least a portion of the light irradiated from the light source part, and the shutter member for the surface irradiation pattern may have a shape having a through area that has a shape corresponding to the surface irradiation pattern.

The plurality of shutter members include a turn-signal shutter member that transmits at least a portion of the light irradiated from the light source part to form a light distribution pattern for a turn signal, and the turn-signal shutter member may include an upper shutter member coupled to an upper circumferential area famed in an upper area of the circumferential area, and a lower shutter member coupled to a lower circumferential area of a lower area thereof.

At least some of the plurality of shutter members may include a micro lens array.

At least some of the plurality of shutter members may include a base resin defining a body of the shutter member and that transmits the light irradiated from the light source part, and a diffusing agent provided in the base resin and that diffuses the light irradiated from the light source part.

At least some of the plurality of shutter members may include a base body defining a body of the shutter member and that transmits the light irradiated from the light source part, and a fine convexo-concave part provided on a front surface or a rear surface of the base body, and in which a pattern that diffuses the light irradiated from the light source part is formed.

At least some of the plurality of shutter members may have a shape, in which a plurality of fine holes that increases a diffusion angle of the light irradiated from the light source part and output the light to a front side or to diffract the light irradiated from the light source part and output the light to the front side are formed at a shutter body of the shutter member.

Sizes of some of the fine holes may be different from sizes of others.

The lamp may further include a first inner lens provided between the light source part and the shutter unit, and to which the light irradiated from the light source part is input, and a second inner lens provided on a front side of the shutter unit, and to which the light output from the shutter unit is input, a distance between the shutter unit and the second inner lens may be smaller than a distance between the shutter unit and the first inner lens.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, a lamp for a vehicle according to the present disclosure will be described with reference to the drawings.

Figure 1:
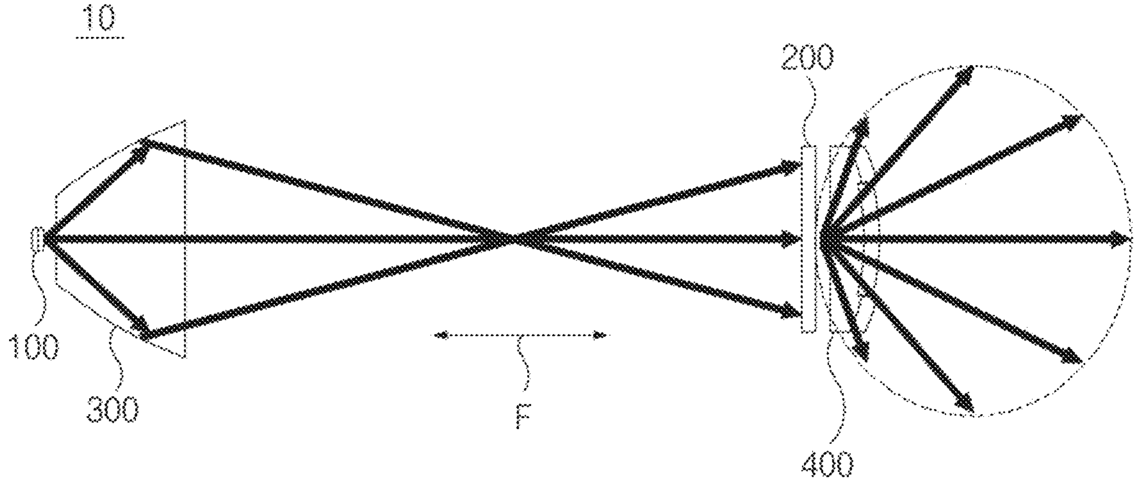
FIG. 1 is a side view schematically illustrating a lamp for a vehicle according to the present disclosure.
Figure 2:
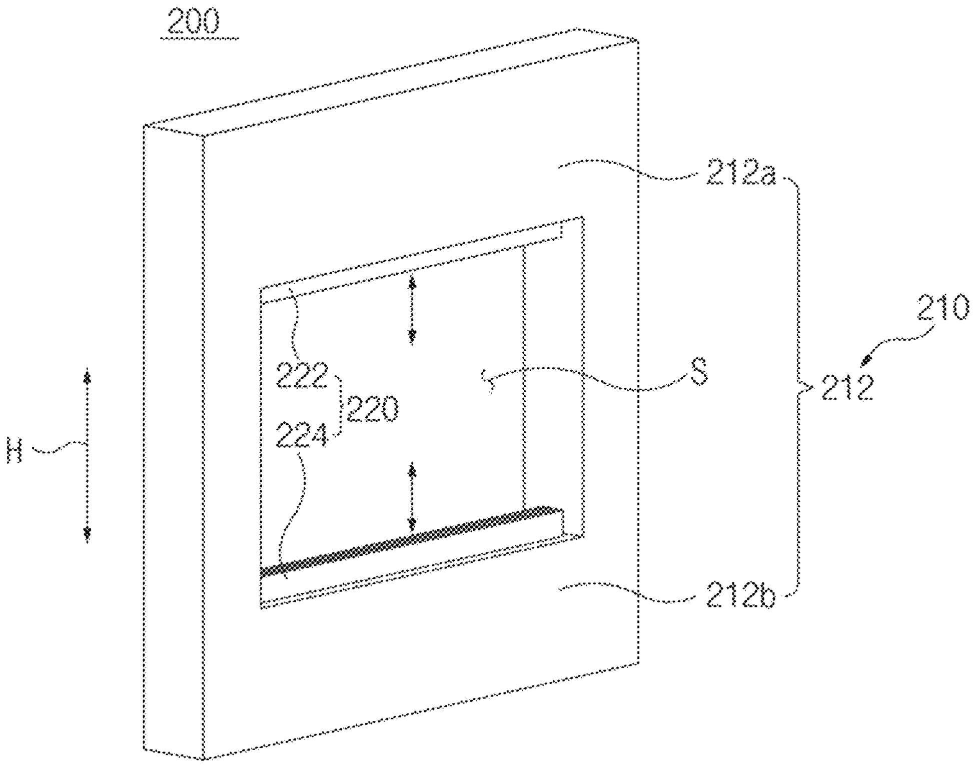
FIG. 2 is a perspective view illustrating a shutter unit of a lamp for a vehicle according to the present disclosure.
Figure 3:
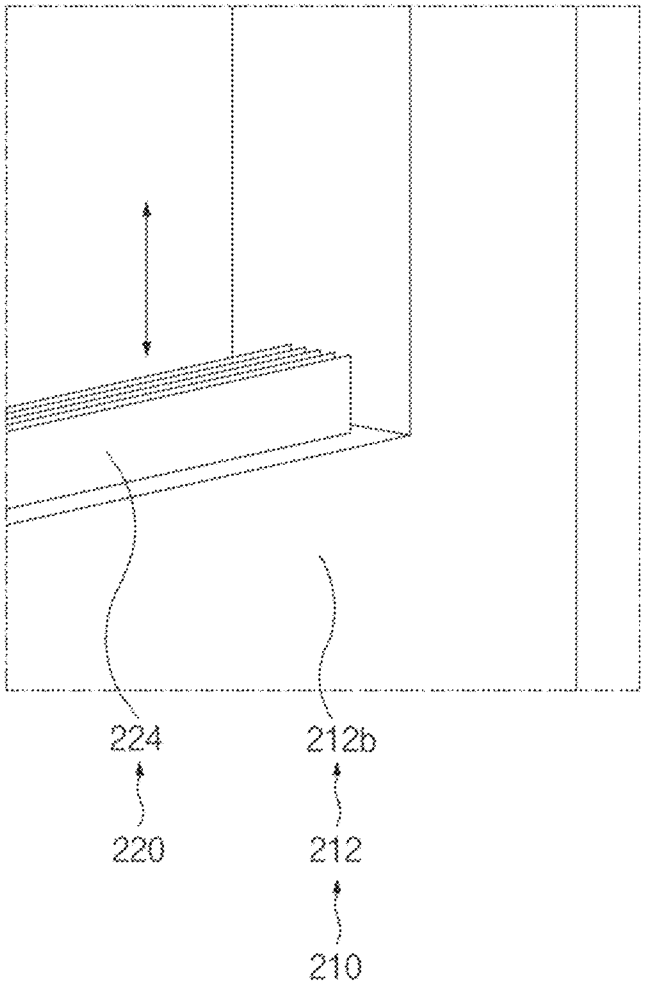
FIG. 3 is an enlarged view illustrating a coupling structure of a unit body and a shutter member in a shutter unit of FIG. 2.

FIG. 1 is a side view schematically illustrating a lamp for a vehicle according to the present disclosure. FIG. 2 is a perspective view illustrating a shutter unit of the lamp for a vehicle according to the present disclosure. FIG. 3 is an enlarged view illustrating a coupling structure of a unit body and a shutter member in the shutter unit of FIG. 2.

A lamp 10 for a vehicle (hereinafter, a 'lamp') according to the present disclosure may have a structure that may form various kinds of light distribution patterns. In particular, according to the present disclosure, various kinds of light distribution patterns may be famed to have a simple structure while having a remarkably small size as compared with a conventional technology.

The lamp 10 according to the present disclosure may include a light source part 100 that irradiates light, and a shutter unit 200 that is provided on a front side of the light source part 100 to shut at least a portion of the light. As will be described below, because the shutter unit 200 may include a shutter member that shuts (i.e., blocks) the light output from the light source part 100 in various forms, it may contribute to forming various forms of light distribution patterns.

The shutter unit 200 may include a plurality of shutter members 220 that may be moved in a direction that crosses the forward/rearward direction "F" of the lamp 10 (i.e., between the lamp 10 and shutter members 200). As an example, as illustrated in FIGS. 2 and 3, the plurality of shutter members 220 may be configured to be moved in an upward/downward direction "H" of the lamp 10. However, unlike the illustration of the drawings, the plurality of shutter members 220 may be configured to be moved in the leftward/rightward direction.

In more detail, the shutter unit 200 may further include a unit body 210 having a through-hole "S" having a shape that passes therethrough along the forward/rearward direction "F". The light irradiated from the light source part 100 may be output after passing through the through-hole "S" of the unit body 210 to form a specific light distribution pattern.

Meanwhile, the plurality of shutter members 220 may be coupled to a circumferential area 212 that defines a border of the through-hole "S" in the unit body 210, and may be configured to be movable with respect to the circumferential area 212. Accordingly, as the shutter member 220 is moved, at least a partial space of the through-hole "S" may be occupied by the shutter member 220, and the light irradiated from the light source part 100 may be output to the outside after reaching the shutter member 220 to be shut or after a path of the light is changed. In particular, as will be described below, because the plurality of shutter members 220 may have different optical characteristics, the kind of the light distribution pattern may vary according to whether movement of the shutter member 220 is controlled such that any one of the plurality of shutter members 220 occupies the through-hole "S". As shown in FIGS. 2 and 3, the plurality of shutter members 220 may be coupled to the unit body 210 to be movable in the upward/downward direction "H". Meanwhile, the driving of the shutter unit 200 may be electronically controlled. In more detail, the movement of the shutter member 220 may be controlled through an electric wire connected to an external power source. For example, it may be understood that the driving of the shutter unit 200 is similar to driving of a focal plane shutter used in a camera.

Furthermore, as illustrated in FIGS. 2 and 3, the plurality of shutter members 220 may be configured to be spaced apart from each other along the forward/rearward direction "F", and the plurality of shutter members 220 may be configured to overlap each other when the shutter unit 200 is viewed in a state in which they are spaced apart from the shutter unit 200 to one side or the forward/rearward direction "F". In this case, because a volume occupied by the shutter unit 200 may be decreased, the lamp 10 according to the present disclosure may be made smaller. Meanwhile, as described above, the plurality of shutter members 220 are configured to overlap each other, and thus, when one of the plurality of shutter members 220 is moved to occupy the through-hole "S", the remaining ones of the plurality of shutter members 220 may properly form the light distribution pattern that is to be foamed when they are moved to be spaced apart from the through-hole "S".

Referring to FIG. 3, the circumferential area 212 of the unit body 210 may include an insertion section having a shape that is recessed in a direction that becomes farther from the through-hole "S", and the plurality of shutter members 220 may be configured to be inserted into the insertions section. Accordingly, when a specific light distribution pattern is to be formed by the lamp 10, the shutter member 220 that contributes to forming the above-described light distribution pattern may protrude from the above-described insertion section to be moved so as to occupy the through-hole "S", and the remaining shutter members 220 may continue to be inserted into the insertion section. For example, it may be understood that the shutter member 220 is inserted into the circumferential area 212 through an insertion space.

The plurality of shutter members 220 described in the specification may be distinguished according to which kinds of light distribution pattern they contribute. For example, when the lamp 10 according to the present disclosure forms a light distribution pattern for a low beam, a light distribution pattern for a DRL, and a light distribution pattern for a turn signal, the plurality of shutter members 220 may be classified into i) shutter members that contribute to forming a light distribution pattern for a low beam, ii) shutter members that contribute to forming a light distribution pattern for a DRL, and iii) shutter members that contribute to foaming a light distribution pattern for a turn signal.

Then, according to the present disclosure, at least some of the plurality of shutter members 220, which contribute to form different light distribution patterns, may include a plurality of areas. That is, as illustrated in FIG. 2, the shutter members 220 may include an upper shutter member 222 that is coupled to an upper circumferential area 212*a* formed in an upper area of the circumferential area 212, and a lower shutter member 224 that is coupled to a lower circumferential area 212*b* formed in a lower area of the circumferential area 212. In more detail, the upper shutter member 222 may be inserted into the insertion section formed in the upper circumferential area 212*a*, and the lower shutter member 224 may be inserted into the insertion section formed in the lower circumferential area 212*b*. As an example, FIG. 2 illustrates a state in which the upper shutter member 222 is coupled to the upper circumferential area 212*a* to be moved in the upward/downward direction "H" that crosses the forward/rearward direction "F" and the lower shutter member 224 is coupled to the lower circumferential area 212*b* to be moved in the upward/downward direction "H" that crosses the forward/rearward direction "F".

Figure 4:
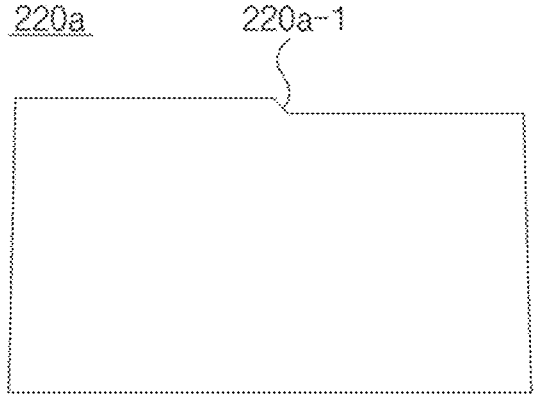
FIG. 4 is a view illustrating a shutter member for a low beam that may be provided in a shutter unit according to the present disclosure.

FIG. 4 is a view illustrating the shutter member for a low beam that may be provided in the shutter unit according to the present disclosure.

The lamp 10 according to the present disclosure may foam a light distribution pattern for a low beam. To achieve this, as illustrated in FIG. 4, the plurality of shutter members may include a shutter member 220*a* for a low beam having a cutoff area 220*a*-1 having a step shape at an upper end thereof. The cutoff area 220*a*-1 is adapted to form a cutoff line required by a rule in a light distribution pattern for a low beam, and may shut the light that is output from the light source part 100 and reaches the shutter member 220*a* for a low beam to form a light distribution pattern for a low beam. Meanwhile, as described above, no cutoff area 220*a*-1 may be formed in the shutter member 220*a* for a low beam.

As an example, the shutter member 220*a* for a low beam may include the lower shutter member 224 (see FIG. 2) that is coupled to the lower circumferential area 212*b* formed in the lower area of the circumferential area 212 of the unit body 210, and may not include the upper shutter member 222. That is, when the light distribution pattern for a low beam is to be famed, the shutter member 220*a* for a low beam may be moved upwards and may occupy the lower area of the through-hole "S". In this case, the light that is output from the light source part 100 and reaches the lower area of the through-hole "S" is shut by the shutter member 220*a* for a low beam and the light that reaches the upper area of the through-hole "S" may pass through the shutter unit 200 to form the light distribution pattern for a low beam. In this case, the light output from the light source part 100 may be output while being reversed in the upward/downward direction when it is output to the outside of the lamp 10.

Meanwhile, as described above, the light that is output from the light source part and reaches the shutter member 220*a* for a low beam may be shut. Accordingly, the shutter member 220*a* for a low beam may include a non-light transmissive material that shuts the light irradiated from the light source part 100, or may be formed of a non-light transmissive material.

Figure 5:
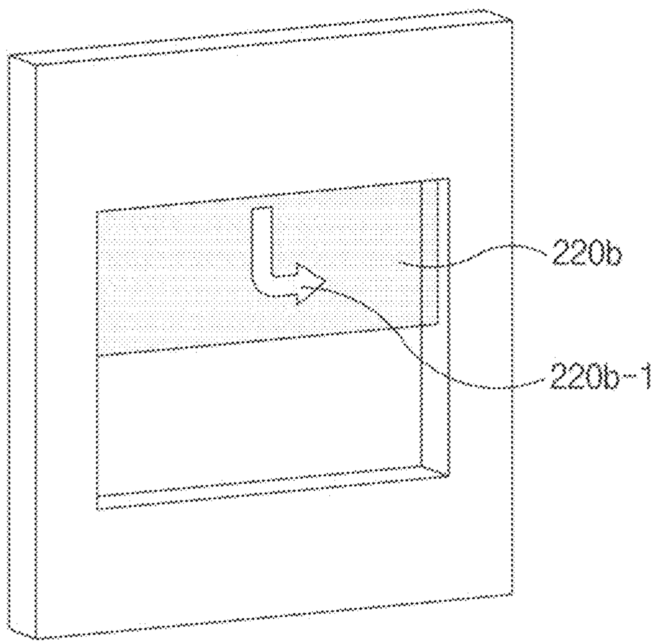
FIG. 5 is a view illustrating a shutter member for a surface irradiation pattern that may be provided in a shutter unit according to the present disclosure.

FIG. 5 is a view illustrating a shutter member for a surface irradiation pattern that may be provided in the shutter unit according to the present disclosure.

The lamp 10 according to the present disclosure may foam a light distribution pattern for a low beam. The surface irradiation pattern may be a light distribution pattern for implementing a shape of an image or the like for information (for example, information on schedules for a lane change direction or a rightward/leftward rotation) for travel of a vehicle when light is output from the lamp and is irradiated to a road surface. Welcome light that is irradiated to a road surface when a vehicle is unlocked with a key of a driver also may be an example of a surface irradiation pattern.

Referring to FIG. 5, the plurality of shutter members may include shutter members 220*b* for a surface irradiation pattern that foams a surface irradiation pattern by shutting at least a portion of the light irradiated from the light source part 100. Then, the shutter member 220*b* for a surface irradiation pattern may have a shape, in which a through area 220*b*-1 having a shape corresponding to the surface irradiation pattern in the shutter body of the shutter member for a surface irradiation pattern. For example, as illustrated in FIG. 5, the through area 220*b*-1 may have a shape corresponding to an arrow shape that indicates information on a steering direction. When the shutter member 220*b* for a surface irradiation pattern is a configuration for forming welcome light, the above-described through area 220*b*-1 may have a shape corresponding to a shape of the welcome light. More preferably, the shutter member 220*b* for a surface irradiation pattern may include a non-light transmissive material that shuts the light irradiated from the light source part 100 or may be formed of the non-light transmissive material. In this case, the light irradiated from the light source part 100 and reaches the shutter member 220*b* for a surface irradiation pattern, except for the light that reaches the through area 220*b*-1, may be shut.

Meanwhile, as an example, FIG. 5 illustrates a state, in which the shutter member 220*b* for a surface irradiation pattern includes only the upper shutter member 222 that is coupled to the upper circumferential area 212*a* formed in the upper area of the circumferential area 212 of the unit body 210 and does not include the lower shutter member. However, unlike this, the shutter member 220*b* for a surface irradiation pattern may include only the lower shutter member, and may include both of the upper shutter member and the lower shutter member. Meanwhile, when the shutter member 220*b* for a surface irradiation pattern includes only the upper shutter member 222 and the above-described shutter member 220*a* for a low beam includes only the lower shutter member 224, the shutter unit 200 may be driven such that the upper area of the through-hole "S" is occupied by the shutter member 220*b* for a road surface irradiation pattern and the lower area of the through-hole "S" is occupied by the shutter member 220*a* for a low beam. In this case, the light distribution pattern for a low beam and the pattern for a surface irradiation may be simultaneously implemented.

Furthermore, the lamp 10 according to the present disclosure may further form a light distribution pattern for a DRL. Accordingly, the plurality of shutter members may include the shutter member for a DRL that forms a light distribution pattern for a DRL as they transmit at least some of the light irradiated from the light source part 100.

In a preferred example, the shutter member for a DRL may be a configuration that transmits the light irradiated from the light source part 100. However, as will be described above, the shutter member for a DRL may have a structure that may secure a wide diffusion angle that is required in the light distribution pattern for a DRL by causing the light irradiated from the light source part 100 to be output while being diffused when it is output from the shutter member for a DRL.

As an example, the shutter members may include the upper shutter member 222 that is coupled the upper circumferential area 212*a* of the unit body 210, which is famed in an upper area of the circumferential area 212, and the lower shutter member 224 that is coupled to the lower circumferential area 212*b* formed in a lower areas (see FIGS. 2 and 3).

Furthermore, the lamp 10 according to the present disclosure may further form a light distribution pattern for a turn signal. Accordingly, the plurality of shutter members may include the shutter member for a turn signal that forms a light distribution pattern for a turn signal as they transmit at least some of the light irradiated from the light source part 100.

In a preferred example, the shutter member for a turn signal may be a configuration that transmits the light irradiated from the light source part 100. However, as will be described above, the shutter member for a turn signal may have a structure that may secure a wide diffusion angle that is required in the light distribution pattern for a turn signal by causing the light irradiated from the light source part 100 to be output while being diffused when it is output from the shutter member for a turn signal.

As an example, the shutter members for a turn signal may include the upper shutter member 222 that is coupled the upper circumferential area 212*a* of the unit body 210, which is formed in an upper area of the circumferential area 212, and the lower shutter member 224 that is coupled to the lower circumferential area 212*b* formed in a lower areas (see FIGS. 2 and 3).

Meanwhile, the lamp 10 according to the present disclosure may further form a light distribution pattern for a high beam. In more detail, the light distribution pattern for a high beam may be formed as all of the plurality of shutter members 220 provided in the lamp 10 according to the present disclosure are moved to become farther from the through-hole "S" and are moved to be maximally inserted into the circumferential area 212 and the light that is irradiated from the light source part 100 and reaches the shutter unit 200 is output through the through-hole "S".

Hereinafter, a unit for securing a wide diffusion angle to cause the lamp 10 according to the present disclosure to form the light distribution pattern for a DRL and the light distribution pattern for a turn signal will be described.

Figure 6:
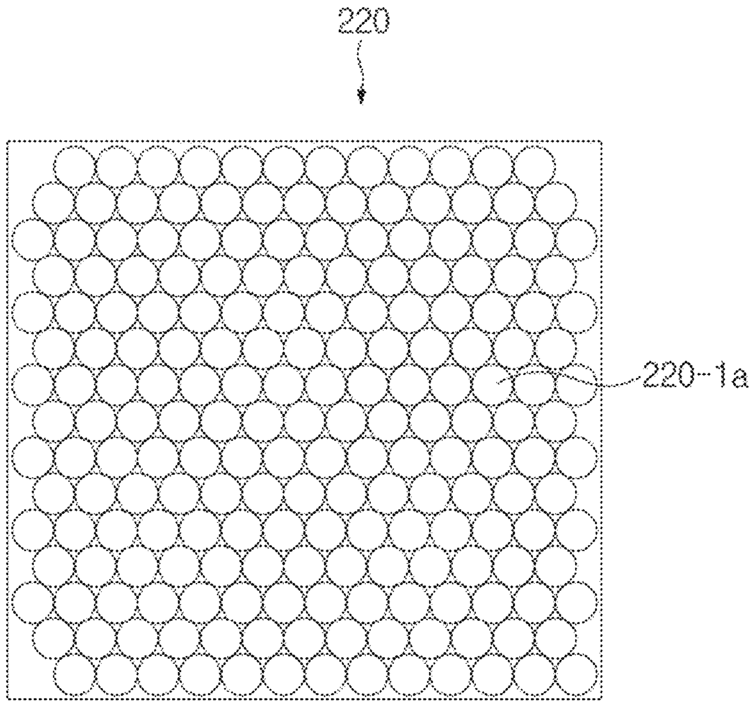
FIG. 6 is a view illustrating a state, in which a micro lens array area is famed in a shutter member of a shutter unit, according to the present disclosure.

FIG. 6 is a view illustrating a state, in which a micro lens array area is formed in the shutter member of the shutter unit, according to the present disclosure.

At least some of the plurality of shutter members 220 provided in the shutter unit 200 of the lamp 10 according to the present disclosure may include a micro lens array area 220-1*a*. In more detail, as an example, the micro lens array area 220-1*a* may be formed on a front surface of the shutter member 220.

The micro lens array area 220-1*a* may have a shape that is diffused when the light that is irradiated from the light source part 100 and is input to the shutter member 220 is output after passing through the shutter member 220. For example, the micro lens array area 220-1*a* may have a recessed concave lens shape. However, unlike the above description, the micro lens array area 220-1*a* may have a convex lens shape, and may have a shape, in which a concave lens and a convex lens are combined.

Figure 7:
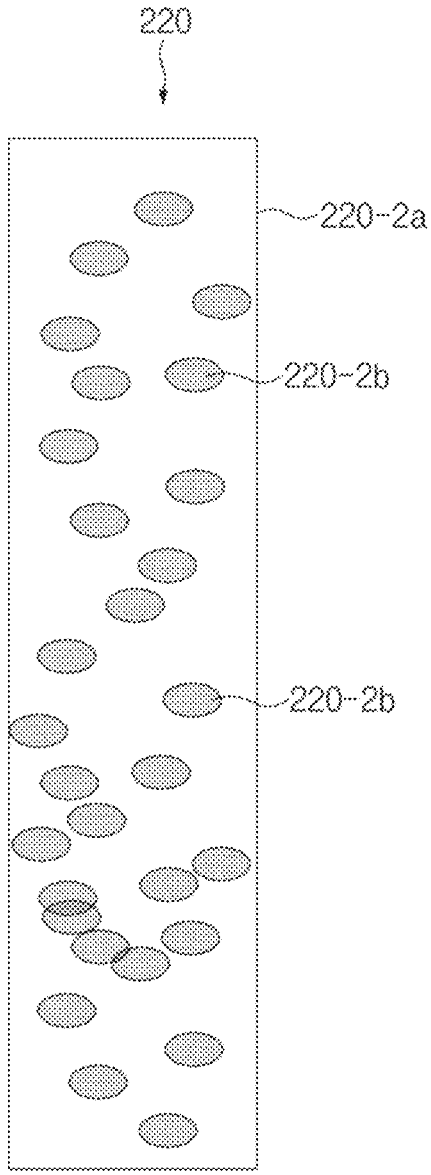
FIG. 7 is a view illustrating a state, in which a base resin and a diffusing agent are applied to a shutter member of a shutter unit, according to the present disclosure.

FIG. 7 is a view illustrating a state in which a base resin and a diffusing agent are applied to the shutter member of the shutter unit, according to the present disclosure.

At least some of the plurality of shutter members 220 provided in the shutter unit 200 of the lamp 10 according to the present disclosure may include a base resin 220-2*a* that defines a body of the shutter member 220 and transmits the light irradiated from the light source part 100, and a diffusing agent 220-2*b* that is provided in the base resin 220-2*a* and diffuses the light irradiated from the light source part 100. As an example, as illustrated in FIG. 7, the diffusing agent 220-2*b* may be provided while being diffused in the base resin 220-2*a*.

Figure 8:
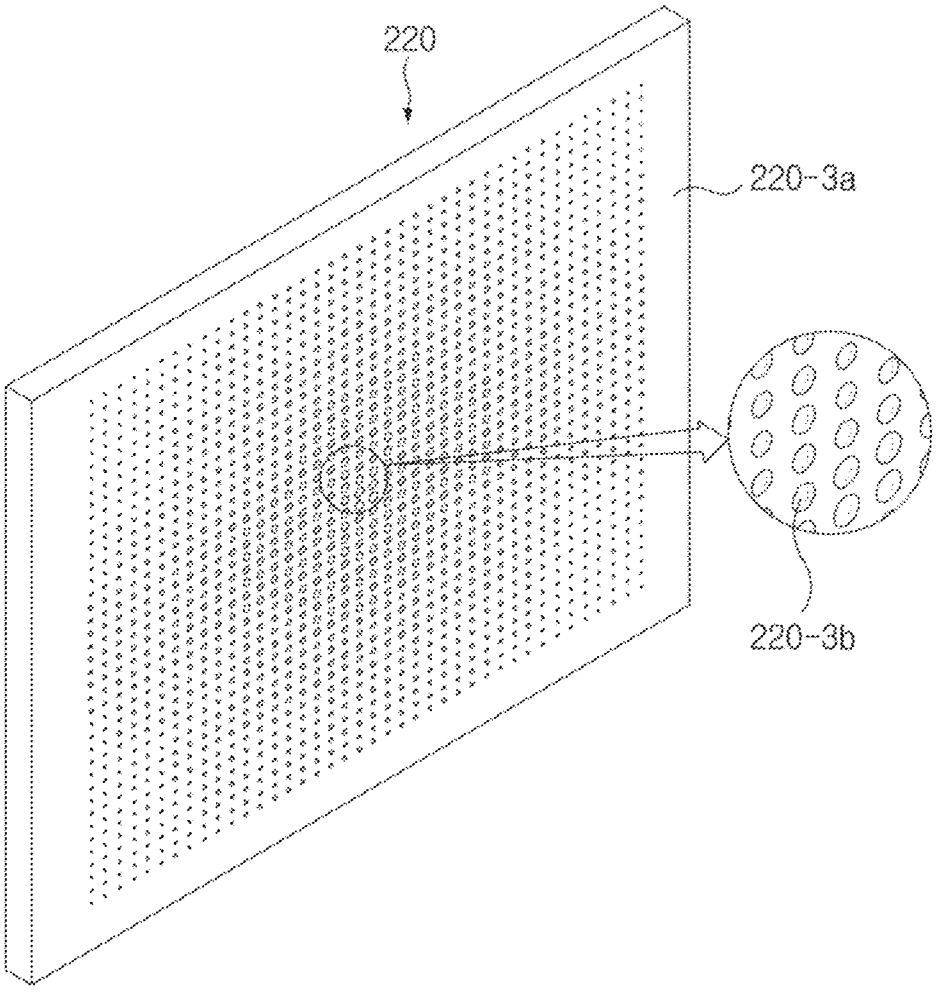
FIG. 8 is a view illustrating a state, in which a fine convexo-concave part is famed in a shutter member of a shutter unit, according to the present disclosure.

FIG. 8 is a view illustrating a state, in which a fine convexo-concave part is formed in the shutter member of the shutter unit, according to the present disclosure.

At least some of the plurality of shutter members 220 provided in the shutter unit 200 of the lamp 10 according to the present disclosure may include a base body 220-3*a* that defines a body of the shutter member 220 and transmits the light irradiated from the light source part 100, and a fine convexo-concave part 220-3*b* that is provided on a front surface or a rear surface of the base body 220-3*a*, and in which a pattern that diffuses the light irradiated from the light source part 100 is formed. As an example, when the fine convexo-concave part 220-3*b* is provided on a front surface of the base body 220-3*a*, the fine convexo-concave part 220-3*b* may have a shape that is recessed toward the base body 220-3*a*, and when the fine convexo-concave part 220-3*b* is provided on a rear surface of the base body 220-3*a*, the fine convexo-concave part 220-3*a* may have a shape that protrudes from the base body 220-3*a*. Furthermore, as an example, the fine convexo-concave part 220-3*b* may be integrally formed with the base body 220-3*a*, but may be provided separately from the base body 220-3*a*.

Figure 9:
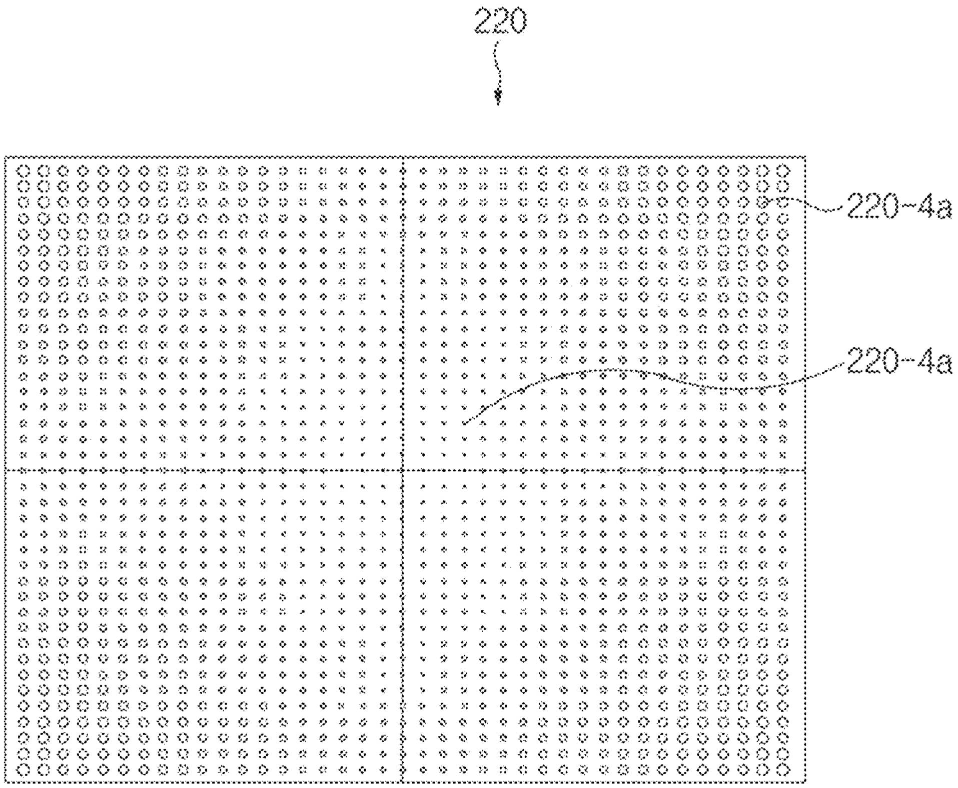
FIG. 9 is a view illustrating a state, in which fine holes are formed in a shutter member of a shutter unit, according to the present disclosure.

FIG. 9 is a view illustrating a state, in which fine holes are formed in the shutter member of the shutter unit, according to the present disclosure.

At least some of the plurality of shutter members 220 provided in the shutter unit 200 of the lamp 10 according to the present disclosure may have a shape, in which a plurality of fine holes **220-4*a* that enhances a diffusion angle of the light irradiated from the light source part 100 to output the light to a front side or diffract the light irradiated from the light source part 100 to output the light to the front side are formed in the shutter body of the shutter member 220. It may vary whether the light output through the fine holes 220-4*a* is diffused or diffracted, according to sizes of the fine holes 220-4*a***.

Meanwhile, sizes of some of the plurality of fine holes **220-4*a* may be different from sizes of others. As an example, as illustrated in FIG. 9, the sizes of the fine holes 220-4*a*** may become larger as they become farther from a central area of the shutter member.

Meanwhile, referring back to FIG. 1, a first inner lens 300 which is provided between the light source part 100 and the shutter unit 200 and to which the light irradiated from the light source part 100 is input, and a second inner lens 400 which is provided on a front side of the shutter unit 200 and to which the light output from the shutter unit 200 is input may be further provided.

Then, a distance between the shutter unit 200 and the second inner lens 400 may be smaller than a distance between the shutter unit 200 and the first inner lens 300. This may be for maximizing an optical efficiency of the lamp by minimizing an amount of the light output after being diffused in the shutter unit 200, which does not reach the second inner lens 400 and is lost.

As an example, the first inner lens 300 may be a total internal reflection (TIR) lens, a collimator or an aspheric lens, and the second inner lens 400 may be an aspheric lens having one focus, an anamorphic lens, a multi-facet lens, or a cylindrical lens.

Meanwhile, the light source part 100 may include a plurality of light sources. In more detail, the light source part 100 may include a plurality of lights that irradiate lights of different colors. For example, the plurality of light sources may include a first light source that irradiates white light to form a light distribution pattern for a low beam, a light distribution pattern for a high beam, and a light distribution pattern for a DRL, and a second light source that irradiates yellow light to form a light distribution pattern for a turn signal. Accordingly, according to the present disclosure, when a light distribution for a low beam, a light distribution pattern for a high beam, and a light distribution pattern for a DRL are to be formed, the first light source may be turned on and the second light source may be turned off, and when a light distribution pattern for a turn signal is to be formed, the second light source may be turned on and the first light source may be turned off.

According to the present disclosure, a lamp for a vehicle of a new type that may implement various kinds of light distribution patterns may be provided.

Although it is apparent that the present disclosure has been described with reference to the limited embodiments and the drawings, the present disclosure is not limited thereto, and the present disclosure may be variously carried out by an ordinary person in the art within the technical spirit of the present disclosure and the equivalent ranges of the claims.

What is claimed is:

1. A lamp for a vehicle comprising:
- a light source part configured to irradiate light; and
- a shutter unit spaced apart from the light source part in a first direction and configured to block at least a portion of the light irradiated from the light source part,
- wherein the shutter unit includes:
  - a plurality of shutter members configured to move linearly in a second direction traversing the first direction extending between the light source part and the shutter unit, and
  - wherein the plurality of shutter members are spaced apart from each other along the first direction.

2. The lamp of claim 1, wherein the plurality of shutter members overlap each other in the first direction.

3. The lamp of claim 1, wherein the second direction is perpendicular to the first direction.

4. The lamp of claim 1, wherein:
- the shutter unit further includes a unit body having a through-hole extending in the first direction, and
- the plurality of shutter members are coupled to a circumferential area of the unit body which defines a border of the through-hole.

5. The lamp of claim 4, wherein the plurality of shutter members are coupled to the unit body to be linearly movable in the second direction.

6. The lamp of claim 4, wherein:
- the circumferential area of the unit body includes an insertion section having a shape that is recessed in a direction that extends away from the through-hole, and
- the plurality of shutter members are inserted into the insertion section.

7. The lamp of claim 4, wherein the shutter member includes:
- an upper shutter member coupled to an upper circumferential area formed in an upper area of the circumferential area; and
- a lower shutter member coupled to a lower circumferential area formed in a lower area of the circumferential area.

8. The lamp of claim 7, wherein:
- the upper shutter member is coupled to the upper circumferential area and is linearly movable in the second direction, and
- the lower shutter member is coupled to the lower circumferential area and is linearly movable in the second direction.

9. The lamp of claim 4, wherein the plurality of shutter members includes a shutter member for a low beam, the shutter member having an upper end portion having a step-shaped cutoff area, having a step shape is formed at an upper end thereof.

10. The lamp of claim 9, wherein the shutter member for the low beam includes a lower shutter member coupled to a lower circumferential area of the circumferential area formed in a lower area of the shutter member.

11. The lamp of claim 9, wherein the shutter member for the low beam includes a non-light transmissive material configured to block the light irradiated from the light source part.

12. The lamp of claim 4, wherein:
- the plurality of shutter members include a shutter member for a DRL configured to transmit at least a portion of the light irradiated from the light source part to form a DRL light distribution pattern, and
- the shutter member for the DRL includes an upper shutter member coupled to an upper circumferential area of the shutter member, and a lower shutter member coupled to a lower circumferential area thereof.

13. The lamp of claim 4, wherein:

the plurality of shutter members include a shutter member for a surface irradiation pattern configured to form the surface irradiation pattern by blocking at least a portion of the light irradiated from the light source part, and the shutter member for the surface irradiation pattern has a shape defining a through area of a shape corresponding to that of the surface irradiation pattern.

14. The lamp of claim 4, wherein:

the plurality of shutter members include a turn-signal shutter member configured to transmit at least a portion of the light irradiated from the light source part to form a light distribution pattern for a turn signal, and the turn-signal shutter member includes an upper shutter member coupled to an upper area of the circumferential area, and a lower shutter member coupled to a lower circumferential area thereof.

15. The lamp of claim 1, wherein at least some of the plurality of shutter members include a micro-lens array.

16. The lamp of claim 1, wherein at least some of the plurality of shutter members include:

a base resin defining a body of the shutter member and configured to transmit the light irradiated from the light source part; and a diffusing agent provided in the base resin and configured to diffuse the light irradiated from the light source part.

17. The lamp of claim 1, wherein at least some of the plurality of shutter members include:

a base body defining a body of the shutter member and configured to transmit the light irradiated from the light source part; and a fine convexo-concave part provided on a front surface or a rear surface of the base body, and in which a pattern that diffuses the light irradiated from the light source part is formed.

18. The lamp of claim 1, wherein at least some of the plurality of shutter members have a shape containing a plurality of fine holes formed at a body of the shutter member and arranged to (1) increase a diffusion angle of the light irradiated from the light source part, (2) output the light to a front side or diffract the light irradiated from the light source part, and (3) output the light to the front side.

19. The lamp of claim 18, wherein sizes of some of the fine holes are different from sizes of others.

20. The lamp of claim 1, further comprising:

a first inner lens provided between the light source part and the shutter unit, and to which the light irradiated from the light source part is input; and a second inner lens provided on a front side of the shutter unit, and to which the light output from the shutter unit is input, wherein a distance between the shutter unit and the second inner lens is smaller than a distance between the shutter unit and the first inner lens.

* * * * *